United States Patent
Neuteboom et al.

(10) Patent No.: US 7,820,776 B2
(45) Date of Patent: Oct. 26, 2010

(54) PROCESS FOR THE PREPARATION OF AN ETHYLENE COPOLYMER IN A TUBULAR REACTOR

(75) Inventors: Peter Neuteboom, Hoensbroek (NL); Geert Imelda Valeer Bonte, Genk (BE); Jacobus Christinus Josephus Franciscus Tacx, Roermond (NL); Marcellinus Guilliam Marie Neilen, Sittard (NL)

(73) Assignee: Saudi Basic Industries Corporation, Riyadh (SA)

( * ) Notice: Subject to any disclaimer, the term of this patent is extended or adjusted under 35 U.S.C. 154(b) by 169 days.

(21) Appl. No.: 11/885,793

(22) PCT Filed: Feb. 27, 2006

(86) PCT No.: PCT/EP2006/001974

§ 371 (c)(1),
(2), (4) Date: Jun. 5, 2008

(87) PCT Pub. No.: WO2006/094723

PCT Pub. Date: Sep. 14, 2006

(65) Prior Publication Data

US 2008/0242809 A1 Oct. 2, 2008

(30) Foreign Application Priority Data

Mar. 9, 2005 (EP) .................. 05075571

(51) Int. Cl.
C08F 220/20 (2006.01)
C08F 2/00 (2006.01)
C08J 5/18 (2006.01)

(52) U.S. Cl. .................. 526/323.2; 526/64; 526/87

(58) Field of Classification Search .................. 526/64, 526/323.2, 87
See application file for complete search history.

(56) References Cited

U.S. PATENT DOCUMENTS

| | | | | |
|---|---|---|---|---|
| 4,788,265 A | * | 11/1988 | Pfleger et al. | .................. 526/64 |
| 5,191,050 A | | 3/1993 | Hert et al. | |
| 5,298,582 A | * | 3/1994 | Brusson et al. | .............. 526/262 |
| 5,444,795 A | | 8/1995 | Tzoganakis | |

FOREIGN PATENT DOCUMENTS

| | | |
|---|---|---|
| EP | 0206894 | 12/1986 |
| EP | 0877051 | 11/1998 |
| GB | 1443394 | 7/1976 |
| JP | 06041238 | 2/1994 |

OTHER PUBLICATIONS

A. Peacock, Handbook of Polyethylene, pp. 43-66, 2000.
A. Peacock, Handbook of Polyethylene, pp. 465-471, 2000.
British Plastics and Rubber, Vacuum Control of Web Stability Improves Sheet Yeild, Jan. 1, 1993, pp. 4-5.
Auger & Nguyen, Using Polymer Characterization Techniques to Predict LDPE Resin Suitability for Extruded Foam App. Journal of Cellular Plastics, vol. 37, Nov. 2001, p. 485-490.
Oveby, Claes, Rheological Indicators of LDPE to Predict Processing Performance in Extrusion Coating, Annual Transactions of Nordic Rheological Society, vol. 13, 2005, p. 187-190.
M. Neilen, Statistical models to describe correlations between molecular mass distribution and extrusion coating processability of autoclave idPE, TAPPI 9th European Conf 2003.
T. Bezigian, The Extrusion Coating Processability of Autoclave idPE and p. 303 of "The extrusion Coating Manual" edited by T. Bezigian, Copyright 1999.

* cited by examiner

*Primary Examiner*—Fred M Teskin
(74) *Attorney, Agent, or Firm*—Jim Wheelington

(57) ABSTRACT

The invention relates to a process for the preparation of a copolymer of ethylene and a monomer copolymerizable therewith.

The polymerization takes place in a tubular reactor at a peak temperature between 290° C. and 350° C., the co monomer is a di- or higher functional (meth)acrylate and the co monomer is applied in an amount between 0.008 mol % and 0.200 mol % relative to the amount of ethylene copolymer.

14 Claims, No Drawings

PROCESS FOR THE PREPARATION OF AN ETHYLENE COPOLYMER IN A TUBULAR REACTOR

The present invention relates to a process for the preparation of a copolymer of ethylene and a monomer copolymerisable therewith. The invention also relates to an ethylene copolymer.

The production processes of polyethylene are summarized in Handbook of Polyethylene by Andrew Peacock (2000; Dekker; ISBN 0824795466) at pages 43-66. Many types of polyethylene exist. Examples of different classes of polyethylene are high density polyethylene (HDPE), low density polyethylene (LDPE), linear low density polyethylene (LLDPE) and very low density polyethylene (VLDPE).

The low density polyethylene can be used alone, blended or co extruded for a variety of packaging, construction, agricultural, industrial and consumer applications. The largest application of LDPE is in films produced for example by the blown or cast extrusion process in both mono and co extrusions. Films made with LDPE exhibit good optical properties, strength, flexibility, seal ability and chemical inertness. The end-use applications include packaging of bakery items, snack foods, consumer durables, disposable diapers, textiles, agricultural film and shrink film.

Another important technical field of application of LDPE is the extrusion coating process. In the extrusion coating process polymers and substrates are combined to form products with specific synergetic characteristics. The increasing processing and product requirements and quality demands may result in several different problems that can occur in the extrusion coating process. Examples of these problems are edge waving, edge tear, web break, gels, streaks, lacing, transfer thickness variation, machine thickness variation and die deposits.

The rheology-related phenomena that may cause problems in extrusion coating are for example web stability, neck-in and draw-down. The web stability is a problem with film processes because between the die exit and the cooling roll, several competing forces combine to complicate the web cooling process. Neck-in is the reduction of film width. It can cause uncoated areas on a substrate. Neck-in is less if the melt elasticity is high. Draw-down is the ability of a melt to be drawn to thin films without breaking and the maximum line speed at which the LDPE web breaks. A melt that is more viscous than elastic favors draw-down.

In extrusion coating, the thin molten polymer film is coated on the substrate. At high extrusion coating speed, even a minor disturbance on the melt web causes major quality problems that can very rapidly lead to large quantities of waste. Therefore polymers are required with high and consistent quality to avoid waste due to polymer edge instability and web breaks.

Today LDPE produced by using high-pressure autoclave technology is the commercially applied polyethylene for use in extrusion coating applications. LDPE obtained with an autoclave process is suitable to be applied in extrusion coating for reasons of processability (web stability, draw-down and neck-in) in relation to the molecular composition (broad distribution, long chain branching) of the polymer.

As described in "Vacuum control of web stability improves sheet yield" (British Plastics and Rubber; Jan. 1, 1993; pages 4-5) the web stability or web width variation is a critical problem with film processes because between the die exit and the cooling roll, several competing forces combine to complicate the web cooling process. The film normally exits the die many times thicker than its finished form and must be stretched while in the molten state. The elongation ratios may range between certain values and every polymer has a finite limit beyond it will no longer stretch uniformly. This draw resonance or melt resonance is characterized by a cyclic thick/thin pattern in the web, especially near the die ends.

It is the object of the present invention to provide a LDPE copolymer that enhances the web stability during the extrusion coating process while obtaining also the other desired properties.

The process according to the present invention is characterised in that the polymerisation takes place in a tubular reactor at a peak temperature between 290° C. and 350° C., the co monomer is a di- or higher functional (meth)acrylate and the co monomer is applied in an amount between 0.008 mol % and 0.200 mol % relative to the amount of ethylene copolymer.

According to a preferred embodiment of the invention the co monomer is applied in an amount between 0.008 mol % and 0.100 mol % relative to the amount of ethylene copolymer.

The preferred amount of di- or higher functional (meth) acrylate results in the desired molecular structure which determines the end performance of the product.

According to another preferred embodiment of the invention the polymerisation takes place at a temperature between 300° C. and 340° C.

According to a further preferred embodiment of the invention the polymerisation takes place at a temperature between 310° C. and 330° C.

According to a preferred embodiment of the invention the difunctional co monomer is a difunctional (meth)acrylate.

Preferred di(meth)acrylates are 1,4-butanedioldimethacrylate (BDDMA), hexanediol dimethacrylate (HDDMA), 1,3-butylene glycoldimethacrylate (1,3-BGDMA), ethylene glycol dimethacrylate (EGDMA), dodecanediol dimethacrylate (DDDMA), trimethylol propane trimethacrylate (TMPTMA) and/or trimethacrylate ester (TMA ester).

Most preferred co monomers are 1,4-butanedioldimethacrylate and/or trimethylol propane trimethacrylate.

According to a further preferred embodiment of the invention the co monomer is 1,4-butanedioldimethacrylate.

The use of the polymer obtained with the process according to the invention in the extrusion coating process results in improved web stability.

Furthermore, the polymer obtained with the process according to the invention has the required rheological properties to ascertain good web width variation, neck in (shrinkage in width of the LDPE web) and draw down (the maximum line speed at which the LDPE web breaks).

It is an advantage of the process according to the invention that an unexpectedly good combination of web stability, neck-in and draw down, adhesion, printability, barrier properties, hot tack and heat-sealing performance is obtained. It is very surprisingly that these properties can be obtained with LDPE obtained with a tubular process.

The product yield of the polymerisation is high.

The polymer obtained with the process according to the invention also results at higher coating speeds in a high and in a consistent quality of the polymer to avoid waste due to polymer edge instability and web breaks.

Said improvements and advantages are obtained by the combination of specific features being the polymerisation in the tubular reactor, the polymerisation at the specific peak temperature, the selection of the specific co monomer and the use of the specific amount of the selected specific co monomer.

The simultaneous selection of the temperature, the co monomer and the amount of the co monomer is very critical with respect to the desired properties. If for example the amount of the difunctional (meth)acrylate is above 0.200 mol % the gel content will be too high, if for example the difunctional (meth)acrylate is not present the web stability is insufficient, if for example the peak temperature is less than 290° C. the needed amount of the co monomer is too high and consequently the gel content will be too high and if for example the peak temperature is higher than 350° C. the polymerisation process will be instable.

A man skilled in the art in the technical field of extrusion coating considers only low density polyethylene manufactured on a high pressure autoclave reactor particularly to be adapted to the extrusion coating application. Very surprisingly the tubular polymerisation process according to the present invention provides a polymer which is highly suitable to be applied in an extrusion coating process.

According to a preferred embodiment of the invention the reactor inlet pressure ranges between 100 MPa and 350 MPa.

A relatively low pressure results in a relatively high degree of long chain branching and in improved web stability. However a relatively low pressure also reduces the solvent capability of ethylene, gives more ethylene-LDPE demixing, gives more deposition of LDPE near the reactor wall, more deterioration of heat transfer will occur and a lower conversion is obtained. Therefore an optimum for the reactor inlet pressure has to be selected.

More preferably the reactor inlet pressure ranges between 150 MPa and 300 MPa.

The polymerisation temperature can be optimally controlled by metering an initiator for example an organic peroxide or a mixture of initiators at one injection point or at different injection points. The man skilled in the art has to determine the suitable initiators or mixture of initiators, the concentration of the initiator and the the injection point(s) being most suitable to be used.

To obtain the desired peak temperature the man skilled in the art has to select the initiator (mixture) and the amount of initiator and suitable organic peroxides include for example peroxyester, peroxyketone, peroxyketal and peroxycarbonate such as for example di-2-ethylhexyl-peroxydicarbonate, diacetylperoxydicarbonate, dicyclohexyl-peroxydicarbonate, tert.-amylperpivalate, cumyl perneodecanoate, tert.-butylperneodecanoate, tert.-butyl perpivalate, tert.-butylpermaleinate, tert.-butylperisononanoate, tert.-butylperbenzoate, tert,-butylperoxy-2-ethylhexanoate.tert.-butyl-hydroperoxide, d-tert.butyl peroxide, di-isopropylbenzol hydroperoxide, di-isononanoyl peroxide, didecanoylperoxide, cumol hydroperoxide, methyl isobutyl ketone hydroperoxide, 2,2-bis-(tert.-butylperoxy)-butane and/or 3,4-dimethyl-3,4-diphenylhexane.

Also difunctional or higher functional peroxides may be applied.

According to a preferred embodiment of the invention the peroxide is a difunctional peroxide.

Suitable bifunctional peroxides include for example 2,5-dimethyl-2,5-di-tertiair-butylperoxyhexane, 2,5-dimethyl-2,5-tertiair-peroxyhexyne-3 3,6,9-triethyl-3,6,9-trimethyl-1,4,7-triperoxononane, 3,3,6,6,9,9-hexamethyl-1,2,4,5-tetraoxacyclononane, n-ethyl-4,4-di-tertiair-butylperoxyvalerate, 1,1-di-tertiair-butylperoxy-3,3,5-trimethylcyclohexane, ethyl-3,3-di-tertiair-butylperoxybutyrate 1,1-di-tertiair-butylperoxycyclohexane, 2,2-di-tertiair-butylperoxybutane ethyl-3,3-di-tertiair-amylperoxybutyrate, 2,2-di-4,4-di-tertiair-butylperoxycyclohexylpropane, methyl-isobutyl-peroxide, 1,1-di-tertiair-amylperoxycyclohexane, 1,1-di-tertiair-butylperoxycyclohexane, 2,5-di-methyl-2,5-di-2-ethyl-hexanoylperoxyhexane and/or 1,4-di-tertiair-butylperoxycarbocyclohexane may be applied.

The initiator concentration generally ranges between 0.5 ppm (weight) and 100 ppm (weight) relative to the quantity of ethylene.

During the polymerisation it is also possible to add for example inhibitors, scavengers and/or a chain regulator (such as for example an alcohol, an aldehyde, a ketone or an aliphatic hydrocarbon). Very suitable chain regulators are isopropyl alcohol, propane, propylene and propione aldehyde.

The co monomer may be added at one injection point and at different injection points downstream in the axial direction of the reactor tube.

According to a preferred embodiment of the invention the co monomer is added at different injection points downstream the axial direction of the reactor tube. The use of different injection points results in the desired molecular architecture of the polymer and furthermore in minimised gel formation and optimised processability and optical characteristics.

The reactor may be a tubular polymerisation reactor having the inside surface of the reactor profiled according to for example WO2005/065818. The profile can be provided both on a tube segment and on a coupling between the tube segments the profile forms a solid and integral body with the tube segment and/or with the coupling.

Generally the density of the obtained LDPE ranges between 910 kg/m$^3$ and 935 kg/m$^3$ (according to ISO 1183) and the melt index ranges between 0.10 dg/minute and 100 dg/minute (according to ASTM D 1133).

The copolymer obtained with the process according to the invention may if desired comprise, besides di- or higher functional (meth)acrylate, also other specific co monomers to be able to obtain specific required properties. Preferably, the copolymer consists of ethylene monomer units and di- or higher functional (meth)acrylate units.

The ethylene copolymer obtained with the tubular process according to the present invention is characterised in that the copolymer has the following film properties after applying the extrusion coating process:

the web stability is between 0 and $3.10^{-3}$ m the neck in is between 0 and $120.10^{-3}$ m and the draw down is higher than 300 m/min.

The web stability, the neck in and the draw down were determined using the SABIC Pilot Extrusion Coating Line as disclosed in the presentation "Statistical Models to describe the correlations between the molecular mass distribution and the extrusion coating process ability" by Marcel Neilen on the 2003 TAPPI 9$^{th}$ European PLACE Conference, May 12-14, 2003 in Rome. The neck-in is the shrinkage in width of the LDPE web in comparison with the internal die width.

The ethylene copolymer obtained with the tubular process according to the present invention is characterised in that the gel count is less than 5 particles per m$^2$ larger than $600.10^{-6}$ m.

The gel count is determined according to the "DSM K gel count determination 2245" (using a Göttfert single screw equipment without mixing parts, L/D 20 with an internal cylinder diameter of 30 mm, temperature profile of machine 150° C., 180° C., 220° C., 260° C., 260° C.; temperature of extruder head 260° C., 260° C., 260° C.; 320 mm cast film coat hanger die, die temperature 260° C., screw constant 120 RPM and film thickness $50.10^{-6}$ m).

Very surprisingly these values for the web stability, the neck in and the gel count are obtained with LDPE obtained with a tubular process.

The LDPE obtained with the process according to the invention is suitable to be used in extrusion coating applications for coatings on various substrates such as for example paper, board, cloth, aluminum and other materials. The coatings provide for example a very good adhesion, heat sealing performance and moisture barrier to the substrate. Suitable fields of application are for example liquid packaging cartons, aseptic packaging, food packaging, tapes, paper board cups, food carton stock, frozen food and dual oven able trays, pouches, multi wall bags, release papers and photographic papers such as for example ink jet papers.

The present invention is also directed to an extrusion coating composition comprising polyethylene obtained with the process according to the present invention. These compositions may also comprise other additives being dependent on the desired application.

The polymer obtained with the process according to the invention can also be applied in for example the film segment, for extruded products, in the cast film segment, in packaging applications, in moulding applications for example closures and medical and consumer bottles, in wire and cable coating applications for electrical and communication cables, in foams, in master batches and in blown films.

For example, the process according to the invention results also in an optimal web stability in the process to produce cast film while offering excellent draw properties and neck in for uniform coating. The cast films show low gauge variations and consequently in improved printing and conversion speeds.

The high-pressure polymerisation processes of ethylene are described in Handbook of Polyethylene by Andrew Peacock (2000; Dekker; ISBN 0824795466) at pages 43-53. Since the first production of low density polyethylene there has been an extraordinary divergence of manufacturing processes. Tubular and autoclave reactors are very different technical systems because of for example their disparate profiles requiring different methods of temperature control. The two divergent reactor geometries pose uniquely different chemical engineering problems requiring disparate control conditions. The difference between the essential lack of mixing in the tubular reactor and the high levels of mixing in the autoclave presents the need of distinct control of reaction conditions and hence the molecular structure of the products is different. Consequently the end properties of the polymer are totally different.

During the polyethylene high-pressure process in a tubular reactor polyethylene is prepared by radical polymerisation in supercritical ethylene. Metering an initiator such as for example organic peroxide, azodicarboxylic acid ester, azodicarboxylic acid dinitrile and hydrocarbons that decompose into radicals can start the polymerisation. Oxygen and air are also are suitable to serve as an initiator. The ethylene, which is compressed to the desired pressure, flows through the reactor tube which is provided on the outside with a jacket through which cooling water flows in order to remove the developed heat of reaction via the wall. This reactor has a length between for example 1000 meters and 3000 meters and an internal diameter between for example 0.01 meter and 0.10 meter. The incoming ethylene is first heated to the decomposition temperature of the initiator, whereupon an initiator solution is metered and the polymerisation subsequently starts. Controlling the quantity of initiator attains the desired peak temperature. Thereafter the mixture cools and, after the temperature has dropped to a sufficiently low level, initiator is metered one or more times again via one of the initiator injection points. Downstream from the reactor the obtained product is transported to the product silos after for example extrusion, separation and drying. Owing to the exothermic nature of the reaction, the temperature increases as the reaction proceeds to a maximum peak temperature and considerable heat is evolved. Generally the temperature in the reaction zone of the reactor ranges between 40° C. and 375° C. Generally the reactor inlet pressure ranges between 50 MPa and 500 MPa where reactor inlet pressure refers to the (total) pressure at which the feed stream leaves the compressor and enters the reactor.

The invention is elucidated on the basis of the following non-limiting examples.

EXAMPLES I-II AND COMPARATIVE EXAMPLES A-C

An ethylene copolymer was obtained by polymerising ethylene in a tubular reactor in the presence of 1,4-butanedioldimethacrylate in an amount and with a peak temperature of the polymerisation as indicated in Table I.

As chain transfer agent propylene was added in the low pressure recycle before the primary compressor controlling the melt flow index (MFI) to the value as indicated in Table I.

The initiator was added at injection points downstream in the axial direction of the reactor tube. The reactor inlet pressure amounted to 250 MPa and the outlet pressure amounted to 200 MPa. The total reactor length amounted to 2500 m and the internal tube diameter was 0.05 m.

A pure mono layer of the product obtained was processed on the ER-WE-PA extrusion coating line of SABIC. This coating line is disclosed in the presentation "Statistical Models to describe the correlations between the molecular mass distribution and the extrusion coating processability" by Marcel Neilen on the 2003 TAPPI $9^{th}$ European PLACE Conference, May 12-14, 2003 in Rome.

The extruder throughput was fixed on 0.01 kg/m$^2$ at a velocity of 200 m/min. at the following settings:

Substrate width: $8.10^{-1}$ m

Die temperature: 300° C.

Line speed: up to 1000 m/min

Die gap: $6.10^{-3}$ m

The amount of butane diol dimethacrylate was determined according to the 1H-NMR method. The sample was dissolved in deuterated TCE (tetra chloro ethane) at 120° C. The 1H-NMR spectra were recorded on the Varian Inova 600 MHz spectrometer at 110° C. under the following conditions:

| | |
|---|---|
| measuring time | 1 hr |
| pulse length | 45 degree |
| relax delay | 20 sec |
| number of scans | 128 |
| temperature | 110° C. |

The obtained properties are summarized in Table I.

TABLE I

| Example | Amount of BDDMA mol % | Peak Temperature °C. | Web Stability $10^{-3}$ m | Neck-in $10^{-3}$ m | Draw down m/min | Gel count | MFI dg/min |
|---|---|---|---|---|---|---|---|
| I | 0.049 | 310 | 3 | 117 | 400 | 1.7 | 4.9 |
| II | 0.080 | 300 | 3 | 115 | 325 | 4.8 | 4.9 |
| A | 0.072 | 285 | 6 | 148 | 525 | 0.7 | 4.9 |
| B | 0 | 300 | 8 | 177 | 600 | 3.1 | 4.9 |
| C | 0 | 285 | 13 | 221 | 600 | 2.9 | 5.0 |

The web stability, the neck in and the draw down were determined using the SABIC Pilot Extrusion Coating Line as disclosed in the presentation "Statistical Models to describe the correlations between the molecular mass distribution and the extrusion coating process ability" by Marcel Neilen on the 2003 TAPPI 9$^{th}$ European PLACE Conference, May 12-14, 2003 in Rome.

The gel count is determined according to the "DSM K gel count determination 2245" (using a Göttfert single screw equipment without mixing parts, L/D 20 with an internal cylinder diameter of 30 mm, temperature profile of machine 150° C., 180° C., 220° C., 260° C., 260° C.; temperature of extruder head 260° C., 260° C., 260° C. 320 mm cast film coat hanger die, die temperature 260° C., screw constant 120 RPM and film thickness $50.10^{-6}$ m).

The polymers of Examples I and II obtained with the process wherein the polymerisation of ethylene and 1,4-butanedioldimethacrylate takes place in a tubular reactor at a peak temperature between 290° C. and 350° C. and wherein 1,4-butanedioldimethacrylate is applied in an amount between 0.008 mol % and 0.200 mol % relative to the amount of ethylene copolymer results in a web stability between 0 and $3.10^{-3}$ m a neck in between 0 and $120.10^{-3}$ m a draw down higher than 300 m/min and a gel count less than 5 particles per m$^2$ larger than $600.10^{-6}$ m.

The polymers according to the Comparative Examples A-C result in a web stability higher than $3.10^{-3}$ m and in a neck in higher than $120.10^{-3}$ m.

The invention claimed is:

1. A process for the preparation of a copolymer comprising copolymerizing ethylene and a monomer copolymerizable therewith in a tubular reactor at a peak temperature between 290° C. and 350° C., wherein the monomer copolymerizable therewith is a di- or higher functional (meth)acrylate and is applied in an amount between 0.008 mol % and 0.200 mol % relative to the amount of ethylene copolymer, wherein the (meth)acrylate is 1,4-butanedioldimethacrylate.

2. The process according to claim 1 wherein the peak temperature is between 300° C. and 340° C.

3. The process according to claim 2 wherein the peak temperature is between 310° C. and 330° C.

4. The process according to claim 1 wherein the monomer copolymerizable therewith is applied in an amount between 0.010 mol % and 0.100 mol % relative to the amount of ethylene copolymer.

5. The process according to claim 1 further comprising a reactor inlet pressure between 100 MPa and 350 MPa.

6. The process according to claim 1 wherein the tubular reactor comprises one or more reactor tubes and the monomer copolymerizable therewith is added at different injection points downstream in the axial direction of the reactor tube.

7. An ethylene copolymer comprising units of ethylene monomer and units of a difunctional (meth)acrylate obtained by copolymerizing ethylene and a monomer copolymerizable therewith in a tubular reactor at a peak temperature between 290° C. and 350° C. wherein the monomer copolymerizable therewith is 1,4-butanedioldimethacrylate and is applied in an amount between 0.008 mol % and 0.200 mol % relative to the amount of ethylene copolymer and wherein the copolymer has the following film properties after applying the extrusion coating process: the web stability is between 0 and $3.10^{-3}$ m, the neck-in is between 0 and $120.10^{-3}$ m and the draw-down is higher than 300 m/min.

8. An ethylene copolymer comprising units of ethylene monomer and units of a difunctional meth(acrylate) obtained by copolymerizing ethylene and a monomer copolymerizable therewith in a tubular reactor at a peak temperature between 290° C. and 350° C. wherein the monomer copolymerizable therewith is 1,4-butanedioldimethacrylate and is applied in an amount between 0.008 mol % and 0.200 mol % relative to the amount of ethylene copolymer.

9. An extrusion coating composition comprising an ethylene copolymer obtained by copolymerizing ethylene and a monomer copolymerizable therewith in a tubular reactor at a peak temperature between 290° C. and 350° C. wherein the monomer copolymerizable therewith is 1,4-butanedioldimethacrylate and is applied in an amount between 0.008 mol % and 0.200 mol % relative to the amount of ethylene copolymer.

10. A film comprising an ethylene copolymer obtained by copolymerizing ethylene and a monomer copolymerizable therewith in a tubular reactor at a peak temperature between 290° C. and 350° C. wherein the monomer copolymerizable therewith is 1,4-butanedioldimethacrylate and is applied in an amount between 0.008 mol % and 0.200 mol % relative to the amount of ethylene copolymer.

11. The extrusion coating composition of claim 9 wherein the copolymer has the following film properties after applying an extrusion coating process: the web stability is between 0 and $3.10^{-3}$ m, the neck-in is between 0 and $120.10^{-3}$ and the draw-down is higher than 300 m/min.

12. The extrusion coating composition of claim 9 wherein the copolymer has a gel count is less than 5 particles per m$^2$ larger than $600.10^{-6}$ m after applying an extrusion coating process.

13. The film of claim 10 the copolymer has the following film properties after applying an extrusion coating process: the web stability is between 0 and $3.10^{-3}$ m, the neck-in is between 0 and $120.10^{-3}$ and the draw-down is higher than 300 m/min.

14. The film of claim 10 wherein the copolymer has a gel count is less than 5 particles per $m^2$ larger than $600.10^{-6}$ m after applying an extrusion coating process.

* * * * *